Patented May 18, 1926.

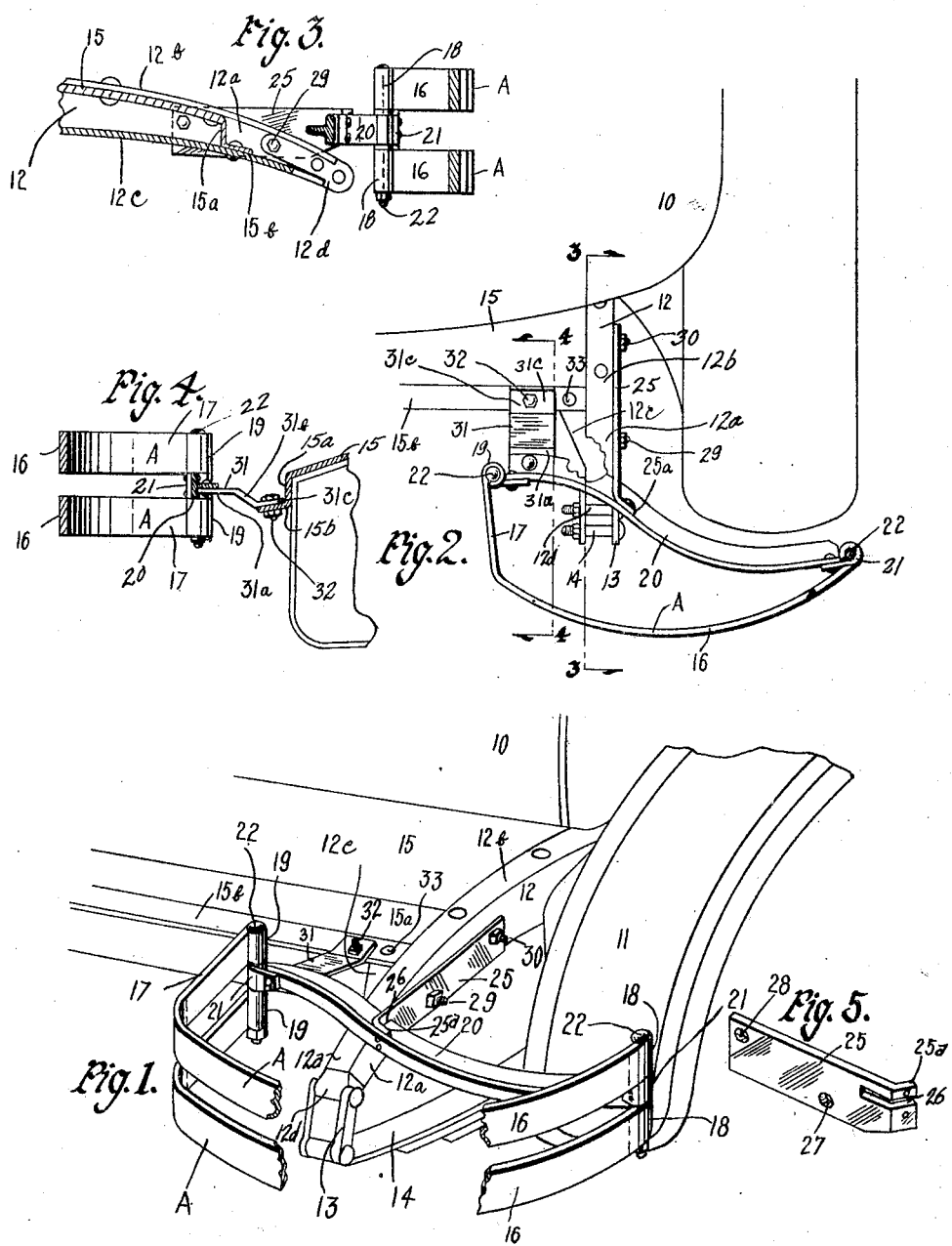

1,585,353

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER AND BUMPER SUPPORT.

Application filed February 11, 1926. Serial No. 87,510.

My invention has to do with a bumper and bumper support for automobiles.

It is my particular purpose to provide a bumper of the type adapted to protect one fender which is ordinarily made and mounted on the car as one of a spaced pair.

A further purpose is to provide such a device peculiarly adapted to be mounted on the latest model Chevrolet car utilizing to the greatest extent the structure of the car for providing a very simple support for the bumper, which can be easily and quickly mounted on the car with a minimum of labor and without interfering with the ordinary car structure.

With these and other objects in view, my invention consists in the construction, arrangement and combination of the various parts of my bumper and bumper support, whereby the objects contemplated are attained, as hereinafter more fully set forth, pointed out in my claims, and illustrated in the accompanying drawings, in which:

Figure 1 is a perspective view of a portion of an automobile having my bumper and bumper support assembled thereon, part of the bumper being broken away for better illustrating the manner of attaching the support to the car.

Figure 2 is a top or plan view of the rear part of the automobile equipped with the bumper and bumper support embodying my invention, part of the bumper being shown in section and part being broken away.

Figure 3 is a detail, sectional view taken on the line 3—3 of Figure 2.

Figure 4 is a similar view taken on the line 4—4 of Figure 2; and

Figure 5 is a perspective view of a part of the bumper supporting means.

In the drawings herewith whereby my invention is illustrated, I have used the reference numeral 10 to indicate generally the body of an automobile which has the fenders 11.

The automobile has the longitudinal frame members 12 in the form of inwardly opening channels.

Each of the members 12 has at its rear end a downwardly inclined portion $12^a$, sometimes called the horn, which supports the spring shackle 13. The shackle 13 is in turn connected with the spring 14.

The frame members 12 are connected by transverse frame members not here shown.

The late model Chevrolet has at the lower rear part of the body a sheet metal member 15 extending rearwardly from the body and into the upper part of the channel 12. At the rear part of the member 15, the strap of sheet metal is bent downwardly as at $15^a$ to the lower part of the channels 12, and then terminates in a rearwardly extending flange $15^b$.

It should perhaps be noted that the channel-shaped frame members 12 have an upper, inwardly, extending flange $12^b$ of substantially the same width throughout and a lower flange $12^c$, which is tapered at its rear end, as illustrated in Figures 1 and 2.

It may be mentioned also that the channel-shaped members are tapered in height from top to bottom at their rear ends, so that the rear ends of the flanges $12^b$ and $12^c$ are closer together.

Received between the rear ends of the flanges $12^b$ and $12^c$ is a fitting $12^d$, which projects rearwardly from the horn above mentioned and to which the spring shackle 13 is connected.

My bumper comprises a pair of vertically spaced spring bumper members A.

Each member A comprises a curved portion 16, which when the device is assembled on the car, stands rearwardly of the rear of the fender for protecting it.

At the inner end of each curved portion 16 is a portion 17 projecting forwardly toward the car in the assembled structure, as shown in Figures 1 and 2.

The spring bumper members A are provided at their outer ends with eyes 18 and at their inner ends with eyes 19. The ends of the spring bumper members A are connected by a rigid curved, connecting member 20 preferably having the form of a T-iron, provided with the eyes 21 at its ends, received respectively between the eyes 18 and the eyes 19, and connected therewith by bolts 22.

The connecting member 20 preferably has its horizontal middle flange extending away from the spring bumper members A toward the automobile.

The bumper proper is supported on the automobile in the following manner:

A relatively, heavy rigid bar 25 is secured to the member 20. The end of the bar 25 connected with the member 20 is provided with a slot 26 receiving the middle flange of the member 20. The ends of the portions of the bar 25 above and below the slot are bent at an angle to the body of the member 25, as shown at 25ª in Figures 1 and 2 and 5, to fit against the upright flange of the member 20 above and below its forwardly projecting flange. These bent end portions 25ª are rigidly connected to the member 20.

The bar 25 has in its lower portion a hole 27 and near its extreme end in its upper portion a hole 28 to receive the bolts 29 and 30, by which the bar 25 is secured to the frame member 12.

The bolt 29 also extends through the fitting 12ª.

The bar 25 is connected with the member 20 between the ends of the latter member, as shown in Figures 1 and 2.

Near what is the inner end of the bumper when the latter is assembled for use, a flat bar 31 has a horizontal flange 31ª rigidly connected with the horizontal flange of the member 20. The bar 31 has a portion 31ᵇ inclined downwardly from the forward part of the portion 31ª and terminating in a forwardly projecting flange 31ᶜ, which is bolted or riveted, as at 32, to the flange 15ᵇ of the sheet metal member 15, close to the wider part of the flange 12ᶜ, as shown in Figures 1 and 2.

The flange 12ᶜ is bolted to the flange 15ᵇ at a point close to the flange 31ᶜ as at 33. (See Figure 2.)

There is thus provided a very simple, but rigid support for the bumper, which is especially adapted for mounting the bumper on an automobile of the type under consideration.

The widening of the flange 12ᶜ adjacent to the bar 31 makes a stronger connection between the member 31 and the flange 15ᵇ, than would be otherwise possible.

I claim as my invention:

1. The combination of an automobile having a longitudinal frame member, comprising a channel opening laterally and having a sheet metal member with its ends received in said channel frame member adjacent to the upper flange thereof, and terminating at one edge in a downwardly extending portion, having its end received in the channel member and formed with a projecting flange at its lower part, the channel member having a widened, lower flange rigidly secured to said last flange, with a bumper and a bumper support comprising a bar secured to the bumper and fixed to said channel member, and a second bumper supporting element secured to the bumper at a point spaced from said first support and inclined toward and fastened to the flange on said sheet metal member adjacent to the point of connection thereof with the widened flange of the channel.

2. The combination of an automobile having a longitudinal frame member, comprising a channel opening laterally and having a sheet metal member with its ends received in said channel frame member adjacent to the upper flange thereof, and terminating at one edge in a downwardly extending portion, having its end received in the channel member and formed with a projecting flange at its lower part, the channel member having a widened lower flange rigidly secured to said last flange, with a bumper and a bumper support comprising a bar secured to the bumper and fixed to said channel member, and a second bumper supporting element secured to the bumper at a point spaced from said first support and inclined toward and fastened to the flange on said sheet metal member adjacent to the point of connection thereof with the widened flange of the channel, said bumper having a rigid T-iron member to which said support and supporting element are fixed.

3. In a device of the class described, a bumper having a cross member, a bar fixed thereto and adapted to be secured to the frame of an automobile, a second bar fixed to said cross member at a point spaced from the first bar and inclined downwardly therefrom and then toward the car body at a point spaced from said first bar.

4. In a device of the class described a bumper having a cross member, a bar fixed thereto at the inner end thereof and adapted to be secured to the frame of an automobile, a second bar fixed to said cross member at a point spaced from the inner end of the cross member and extending forwardly toward the automobile and secured to the frame at a point spaced from the point of connection between the first bar and frame of the automobile.

ALGOT W. NORDGREN.